July 27, 1926.

E. KLAHN ET AL 1,594,304

THERMOSTATIC SWITCH

Filed Jan. 21, 1922    3 Sheets-Sheet 1

INVENTORS
Emil Klahn
Fred L. Muller
BY
W P Preble
their ATTORNEY

July 27, 1926.

E. KLAHN ET AL 1,594,304

THERMOSTATIC SWITCH

Filed Jan. 21, 1922

Emil Klahn
Fred L. Mullen  INVENTORS
BY W. P. Preble
     their ATTORNEY

Patented July 27, 1926.

1,594,304

UNITED STATES PATENT OFFICE.

EMIL KLAHN AND FRED L. MULLEN, OF NEW VERNON, NEW JERSEY.

THERMOSTATIC SWITCH.

Application filed January 21, 1922. Serial No. 530,977. REISSUED

The object of our invention is to provide a thermostatic control for an electric heating device, intended more particularly for household and for other uses, which shall possess certain novel features and advantages, and which shall be more durable, less likely to get out of order, and more economical than similar devices now in use for such purposes.

To this end our invention consists:—

First, in providing electric heating devices with an automatic or thermostatic cut-off of new and peculiar type.

Second, in providing electric heating devices with circuit closers and breakers without causing a spark, or spark-gap.

Third, in providing electric heating devices with means whereby the desired different degrees of heat may be obtained with a single heating coil, which does not become incandescent.

Fourth, in providing electric heating devices with a new type of switch by which the operator may vary the degrees of heat supplied by a single coil.

Fifth, in providing electric heating devices with means whereby the effective heat is continued for an unusually long period after the energizing current is cut off.

In the accompanying drawings we have shown one form of our improved heating device in which all these objects are attained, and in which:—

Figures 4, 5, 6, and 7 are details of the automatic or thermostatic circuit closer or cut-off,—and showing the same in normal contact,—(Fig. 4),—in expanded position under heat,—(Fig. 5),—on the verge of cut-off under pressure from below,—(Fig. 6),—and out of contact (Fig. 7), the cut-off having sprung above the normal or neutral line, as hereafter explained.

Figure 8:
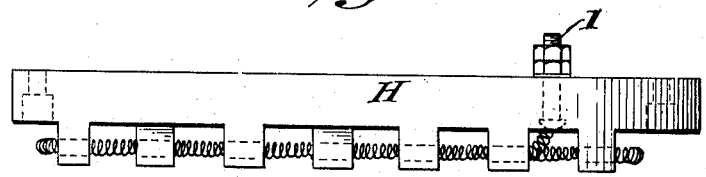

Figure 8 is a side elevation of the rack of insulating material, on which the heating wire is coiled.

Figure 9:
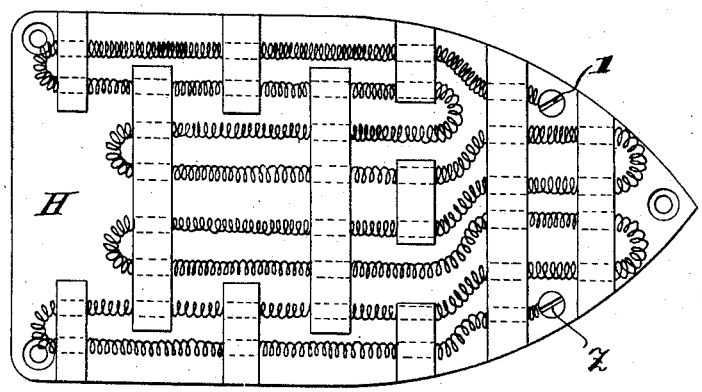

Figure 9 is a bottom plan, thereof, to show the wiring of a single coil of heating wire.

Same letters indicate similar parts in the different drawings.

A, is the hollow body of the electric heating iron, of suitable size and strength. B, is a removable top or lid, held to the body by screws, $a, a, a$, and provided with binding posts, $b, b$. C, is a removable handle, held to the lid B, by screws, $c, c$, and protected by the insulations $d, d$. An oil hole $e$, is provided through the lid, and closed by a suitable set screw.

The most important element in the said heating iron is the automatic cut-off, which, as shown, consists primarily of a resilient, expansible, disc, or snapping plate or membrane, D, sprung into a suitable groove in a holding ring, E, in such way that the material of the membrane must, when left free, bulge either upwardly or downwardly from its centre of suspension. When pressure is applied to repress this bulge, the membrane recedes reluctantly toward what may be called the neutral line, being the horizontal centre of its suspension, but the slightest movement beyond that dead centre, causes the membrane to snap vigorously to its upper or lower bulging position.

By taking advantage of this instantaneous snapping action we are able to break the electric contact and cut off the supply of electric current so suddenly and so completely that no spark occurs from the electric current usually fed on household wires. As an added protection against the creation of a spark-gap, we fill the interior of the iron body A with a non-conducting oil to a depth sufficient to submerge the contact point, as hereafter explained. The ring E, may be integral with the lid B, as shown, or separate and held thereto by screws $f, f$.

On the under side of the membrane is secured an insulating plate F, on which are mounted the contact points $g, g$, in proper relation to contacts $g', g'$ constituting the terminals of the brushes, $h, h$, through which current is derived from the binding posts $h', h'$ which latter support said brushes, the same being secured thereto in the well known manner as indicated.

Figure 4:
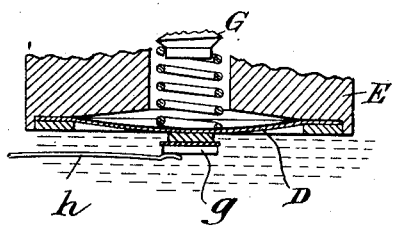

Contact between the points $g, g$ and brushes, $h, h$, is normally maintained by means of the coiled spring $i$, on the adjusting post G, which is accessible from the outside of the iron and turned by hand into any desired position to determine the amount of current, (heat) at which the cut-off shall act to break the circuit. The post G carries a pointer $k$, adapted to travel over the scale I, on which are to be marked such points or degrees of heat as may be taken as stops, generally three, to wit:—maximum heat permitted,—minimum heat used, and zero. It will be readily understood that when the pointer $k$ is turned to the maximum heat, the spring $i$ will be compressed to its normal maximum and will therefore press the membrane D downward with its full force. This position is shown in Figure 4.

Figure 5:
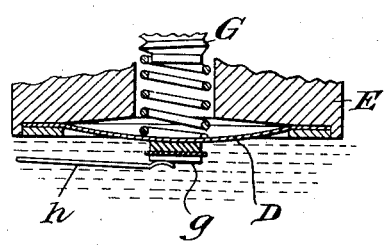

When the membrane expands downwardly under the heat received by the iron from the electric current, its expansive force will bulge the membrane further downward, into the position shown in Figure 5. When this happens, the coiled spring will have been released from part of the pressure of the post G and will appear partly relaxed as shown in said Figure 5.

Figure 6:
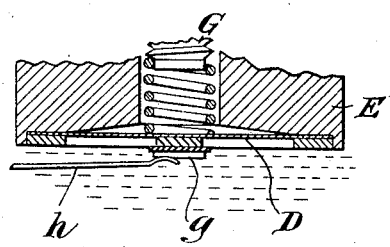
Figure 7:
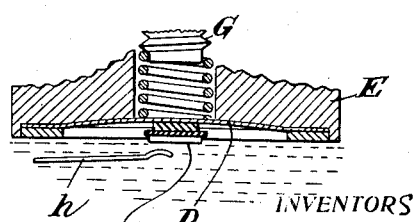

When, as hereafter explained, the heat of the iron approaches the maximum allowed for the cut-off, and upward counter pressure is created against the under side of the membrane and this counter pressure, increasing with the heat, forces the membrane upwardly against the coiled spring, slowly to the position shown in Figure 6, the neutral line, and then, with a sudden snap, upward to the position shown in Figure 7.

Owing to the inherent tendency of two opposing contacts to slightly cohere during the passage therethrough of an electric current of the wattage such as exists in the circuit of an ordinary electric heating iron, the contact portions $g'$, $g'$ of the brushes $h$, $h$ will, during the slow upward movement of the membrane toward its neutral position, temporarily cohere to the contacts $g$, $g$ with the consequence that the brushes $h$, $h$ will be dragged slightly upward beyond their normal or free position shown in Fig. 7, into an abnormal or uppermost position shown in Fig. 6, thus insuring intimate engagement of the opposing contacts until substantially the instant that the snapping action of the membrane occurs. Thereupon the membrane moves into its extreme upper position shown in Fig. 7 and the contacts $g'$, $g'$ being now free, recede downwardly into their normal free position also shown in Fig. 7.

During the aforesaid slow upward movement of the membrane toward the neutral line, the contact portions $g'$, $g'$ of the brushes $h$, $h$, will, because of the resilience of the brushes themselves, move upward from the position shown in Fig. 5 to a position which will enable them to maintain contact with the contacts $g$, $g$, until the central portion of the membrane almost reaches the neutral line though it is not essential, because of the aforesaid additional "dragging" action, that the free position of the contacts $g'$, $g'$ on the brushes shall be quite so accurately positioned in such close proximity with respect to contacts $g$, $g$ when the latter are in their uppermost position, provided that such contacts $g'$, $g'$ in their free position are not so far distant as to preclude contact between brushes $g'$, $g'$ and $g$, $g$ during the upward movement of the diaphragm up to the time that the diaphragm substantially attains momentarily its imaginary neutral line position.

The instant the membrane, during its upward movement, approximates the neutral line, it will snap vigorously into the upward bulging position shown in Fig. 7 and as it snaps it will effect the sudden break or separation between the contacts $g$, $g$ and $g'$, $g'$ irrespective of the aforesaid slight tendency of the same to cohere. As this separation occurs the brushes $h$, $h$ will recede slightly from the position to which they have been dragged, as shown in Fig. 6, to their normal free position shown in Fig. 7.

The diaphragm will remain in its new upwardly bulging position until the cooling of the iron, following the aforesaid separation of the contacts and the interruption of the flow of current through the heating coil progresses to such an extent that the abnormal expanding bulge-power of the snapping membrane, as well as the pressure of the oil vapors upon the under side of the said membrane or diaphragm is gradually reduced and soon a point of equilibrium is reached between the downward pressure of the spring and the upward pressure exerted both by the heated vapors and the upwardly bulging tendency of the heated membrane. Until this point is reached the diaphragm remains in its sprung or uppermost position shown in Fig. 7 but immediately thereafter, owing to the further cooling of the vapors by the radiation and conduction of heat from the inner chamber containing said oil vapors, the diaphragm will slowly or reluctantly recede from its uppermost position toward the neutral or in this case, its center line. Meanwhile the brush contacts $g'$, $g'$ having, as previously stated, receded into their normal or free position shown in Fig. 7, the two contacts will remain separated. As soon, however, as the diaphragm D reaches the neutral line it will, due its inherent snapping action and under the influence of the spring, suddenly or vigorously again snap, as before, but to its lower bulging position and then the upper contacts $g$, $g$ will simultaneously snap into engagement with the lower contact $g'$, $g'$ of the brushes $h$, $h$, with the consequence that no deleterious arcing between the contacts occur when operating on the ordinary house lighting circuits of 110 A. C. or 120 D. C. voltage.

Figure 1:
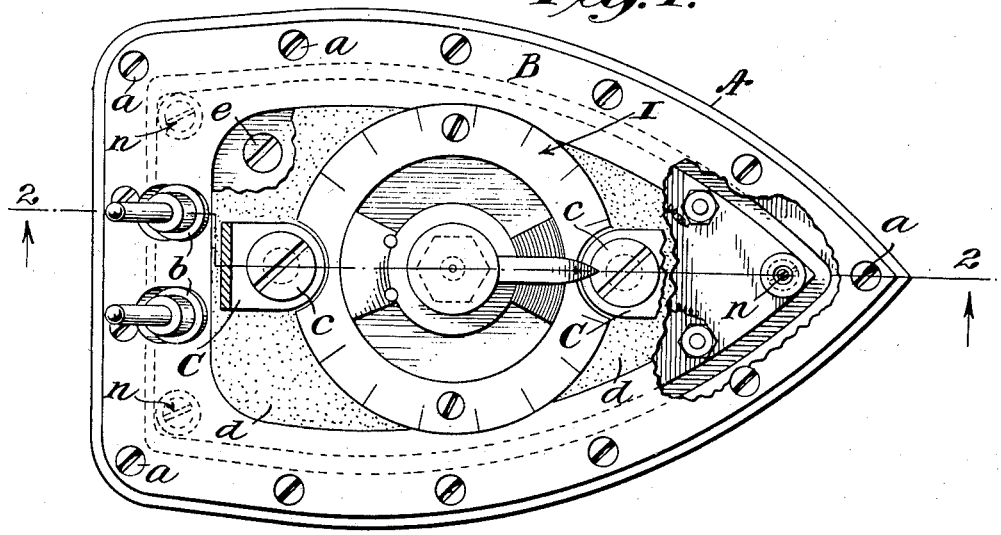
Figure 1 is a top plan.
Figure 2:
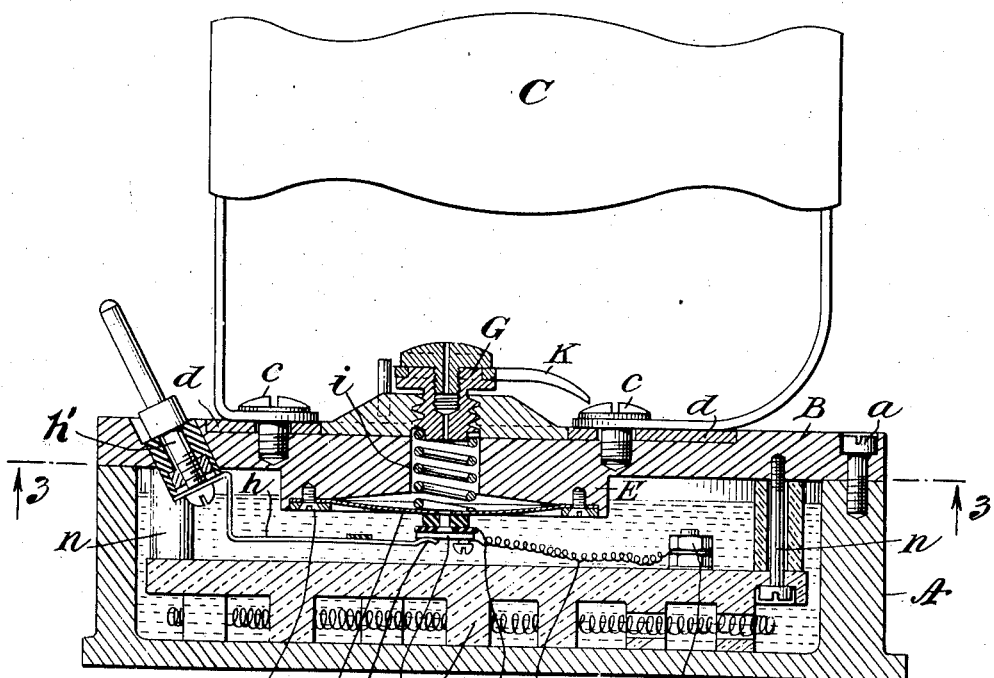
Figure 2 is a vertical section on line 2—2 of Figure 1.
Figure 3:
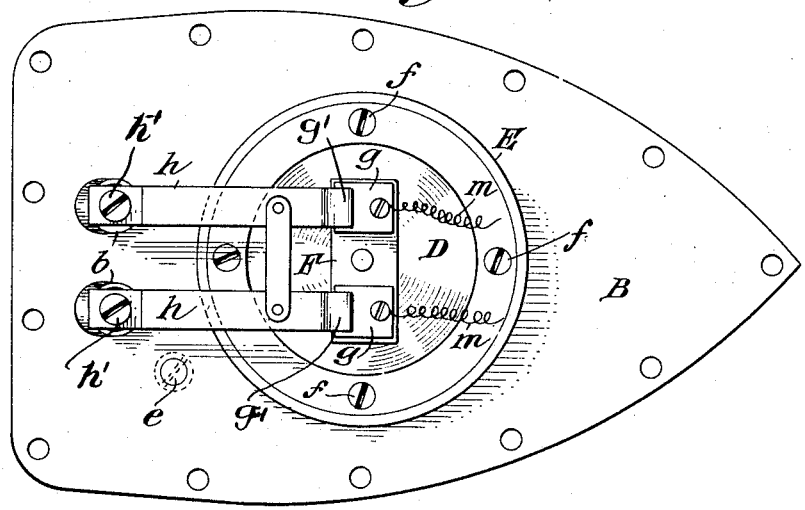
Figure 3 is a horizontal section on line 3—3 looking in the direction of the arrows.

The iron as illustrated is provided with a coil-frame which, as shown in Figures 2, 8 and 9, consists of a table-like structure of non-conducting composition, H, supported by a sort of bridge-like formation, best shown in Figure 9, through which the coil entering and departing by the binding posts $l, l$, is threaded in any desired configuration. The binding posts $l, l$, are connected by the wire $m$, (see Figure 2) to the contact points $g, g$. This single coil element or coil-frame is designed to rest upon the bottom of the hollow body A as shown in Figure 2, and may, if desired, be attached to the under side of the lid B, by screw-posts, $n, n,$ (Fig. 2) so as to be easily removable with said lid, or may be entirely disconnected therefrom. When so disconnected, the coil-frame is adapted to be used in any electric iron the interior of which is large enough to receive the same.

The third important element in the electric heating iron as illustrated consists in the bath of non-conducting, non-inflammable, and somewhat volatile oil, in which the coil-frame is immersed to a level high enough to cover the contact-points $g, g$, and the membrane D, when in its normal downwardly bowed position shown in Figure 2. This oil, of course, gets heated by the wire coil, threaded through the bridge-work of the coil-frame, and communicates this heat to the body A. But, also, and this is an important feature, the oil, under the growing heat gives off heated fumes which by their inherent expansion, exert an upward pressure upon the membrane D, against the resilient force of the coiled spring $i$. The quantity of oil, its space for fume expansion, and the power of the coiled spring are so related to each other that, when the desired maximum heat is reached, the expanding pressure of the oil-fumes will force the downwardly bulging membrane D, just back to a level above the neutral line. As soon as this happens, the membrane, as before stated, snaps up into its normal upwardly bulging position,—due to the upward pressure exerted by the heated vapors and due also to the fact that the membrane itself is at that time heated enough above its normal temperature which combined to make the expanding bulge-power of the membrane greater than the resilient force of the coiled spring.

The current having been cut off by this action, the iron and its contents will, of course, begin to cool, but the heat of the oil, having no escape, other than through the radiation of the outer surface of the iron, itself, keeps the ironing surface of the device efficiently hot for a much longer period than the iron unaided would remain effective.

The many advantages of our improved thermostatic switch, will we think be readily understood without further explanation.

We are aware that in the patent to J. Nathan No. 1,224,313, of May 1, 1917, there is disclosed a knife- or blade-switch which is adapted to be operated by the expansive force exerted upon a yielding diaphragm or movable plunger and also that in the patent to Abshagen No. 436,864, there is disclosed a movable plunger element for carrying a contact that is adapted, as a result of the movement of such plunger, to engage a second co-operating contact under certain conditions of operations and we therefore do not claim broadly such mechanical movement or an electric iron or switch embodying the same in its construction.

While we preferably employ the construction herein described, various modifications within the spirit of the invention may be made without departing from the scope of the invention as embraced within the terms of the appended claims.

We claim:—

1. A thermostatic device, comprising a snapping membrane confined in such a way that a portion thereof is free to bulge under certain conditions of temperature, either upwardly or downwardly with respect to its centre of suspension and adapted to snap vigorously under certain conditions when moved but slightly beyond a dead centre, a fluid medium confined by said membrane and adapted, when expanded, to exert pressure on one side thereof, an electric circuit and an electric switch connected to and adapted to be operated by the sudden movements of said membrane.

2. An electric switch comprising a support, a snapping element carried thereby, a contact element mounted on said snapping element, a second co-operating contact element mounted independently of said snapping element, one of said contact elements being relatively movable with respect to the snapping element, means for conducting electric current from an external source to said contacts, said contacts being capable of maintaining contact while the circuit therethrough is closed until the said snapping element reaches a neutral line and of then vigorously separating and remaining so separated and maintaining the circuit therethrough broken until the snapping element returns to said neutral line, whereupon snapping engagement of the contacts again occurs, whereby deleterious sparking between the contacts is minimized.

3. An electric switch comprising a support, a snapping element mounted in an unstable state on said support, and capable of assuming two positions of rest, a second co-operating contact element mounted independently of said snapping element, one of said contact elements being relatively movable with respect to the snapping element, means for conducting electric current from an external source to said contacts, said contacts being capable of maintaining contact while the circuit therethrough is closed until the said snapping element reaches a neutral line and of then vigorously separating and remaining so separated and maintaining the circuit therethrough broken until the snapping element returns to said neutral line, whereupon snapping engagement of the contacts again occurs, whereby deleterious sparking between the contacts is minimized.

4. An electric switch comprising a support, a diaphragm element carried thereby, a contact element mounted on said diaphragm element, a second co-operating contact element mounted independently of said diaphragm element, one of said contact elements being movable with respect to the diaphragm element, means for conducting electric current from an external source to said contacts, said contacts being capable of maintaining contact while the circuit therethrough is closed until the said diaphragm element reaches a neutral line and of then vigorously separating and remaining so separated and maintaining the circuit therethrough broken until the diaphragm element returns to said neutral line, whereupon snapping engagement of the contacts again occurs, whereby deleterious sparking between the contacts is minimized.

5. A thermostatic device comprising a snapping thermostatic switch having contact members arranged to maintain intimate contact until substantially the instant the snapping action of the switch occurs and to be held out of contact with each other until substantially the instant a further re-snapping action of the switch occurs, an electric circuit adapted to be controlled by said switch and means for conducting electric current from an external source to said circuit.

6. A snapping thermostatic switch having a snapping element adapted to assume two different positions of rest, a heat responsive medium associated with and capable of effecting slow movement of said snapping element out of one of its rest positions, a contact carried by said snapping element, a separate contact carried by an independent support, one of said contact members being movable with respect to the snapping element and means for conducting electric current from an external source to the respective contacts.

7. In a snapping electric switch, the combination comprising a support, a snapping member, provided with a contact element, carried by said support, a second independently mounted contact element, said contact elements being movable relatively to each other and a heat responsive medium adapted under certain conditions to effect the initial slow movement of said snapping member from a position of rest up to the position where the snapping action of such member occurs.

8. A thermostatic switch having snapping make and break actions under the varying conditions of temperature under which it operates and adjusting means for regulating the temperature at which such switch operates.

9. A snapping thermostatic switch having a snapping element, a heat responsive medium of a different character, having a high index of expansion when heated, associated with said snapping element and adapted when heated to slowly force said snapping element away from its normal cold position to a neutral position from which latter position said snapping element snaps into another position, said switch having contact members relatively movable with respect to each other and one of said contact members being movable with respect to said snapping element.

EMIL KLAHN.
FRED L. MULLEN.